United States Patent
Dietz et al.

(10) Patent No.: US 9,683,914 B2
(45) Date of Patent: Jun. 20, 2017

(54) DEVICE FOR MEASURING THE FACES OF A CRANK BEARING

(71) Applicant: JENOPTIK Industrial Metrology Germany GmbH, Villingen-Schwenningen (DE)

(72) Inventors: Guido Dietz, Egmating (DE); Michael Hauptmannl, Gernsbach (DE)

(73) Assignee: JENOPTIK Industrial Metrology Germany GmbH, Villingen-Schwenningen (DE)

(*) Notice: Subject to any disclaimer, the term of this patent is extended or adjusted under 35 U.S.C. 154(b) by 125 days.

(21) Appl. No.: 14/857,409

(22) Filed: Sep. 17, 2015

(65) Prior Publication Data
US 2016/0187225 A1     Jun. 30, 2016

(30) Foreign Application Priority Data
Sep. 19, 2014 (DE) .................. 10 2014 113 553

(51) Int. Cl.
| G01B 7/00 | (2006.01) |
| G01M 13/04 | (2006.01) |
| G01B 5/00 | (2006.01) |
| G01B 5/28 | (2006.01) |

(52) U.S. Cl.
CPC ............. G01M 13/04 (2013.01); G01B 5/003 (2013.01); G01B 5/285 (2013.01)

(58) Field of Classification Search
CPC ........ G01M 13/04; G01B 5/003; G01B 5/285
USPC .......................................... 33/551, 555, 557
See application file for complete search history.

(56) References Cited

U.S. PATENT DOCUMENTS

| 2,329,382 | A | * | 9/1943 | Blazek ................... | B24B 5/421 |
| | | | | | 12/142 F |
| 4,176,461 | A | * | 12/1979 | Gebel .................... | G01B 5/201 |
| | | | | | 33/501.05 |
| 4,646,570 | A | * | 3/1987 | Schoenfeld ............ | G01M 1/24 |
| | | | | | 33/557 |
| 4,776,101 | A | * | 10/1988 | Ishibai ................... | G01B 7/282 |
| | | | | | 33/507 |
| 5,150,545 | A | * | 9/1992 | Esteve .................... | B23Q 1/36 |
| | | | | | 33/501.02 |
| 5,761,821 | A | * | 6/1998 | Laycock ................ | B23Q 17/20 |
| | | | | | 33/501.05 |

(Continued)

FOREIGN PATENT DOCUMENTS

| DE | 1624105 U | * | 6/1951 | ............. G01B 5/201 |
| DE | 3046708 C2 | * | 5/1984 | ............. G01B 5/201 |

*Primary Examiner* — G. Bradley Bennett
(74) *Attorney, Agent, or Firm* — Shlesinger, Arkwright & Garvey LLP (57) ABSTRACT

A crank bearing face measuring device for measuring the faces of crank bearings of a crankshaft has a base body and a device for rotating the crankshaft about a main axis of rotation. The main axis of rotation is defined by the main bearings of the crankshaft. Measuring device also has a measuring head which has a probe prism for placing against a crank pin of the crankshaft, and at least one measuring probe, for placing against a face of the crank bearing to be measured. The measuring head is configured for and connected to the base body in such a way that the measuring head follows an orbital rotation of the crank pin during rotation of the crankshaft about the main axis of rotation.

12 Claims, 5 Drawing Sheets

(56) References Cited

U.S. PATENT DOCUMENTS

| | | | |
|---|---|---|---|
| 6,430,832 B1* | 8/2002 | Dall'Aglio | B24B 5/42 33/555.1 |
| 8,336,224 B2* | 12/2012 | Arnold | B24B 5/04 33/555.1 |
| 8,667,700 B2* | 3/2014 | Dall'Aglio | B24B 5/42 33/555.1 |
| 2003/0009895 A1* | 1/2003 | Dall'Aglio | B24B 5/42 33/555.3 |
| 2003/0056386 A1* | 3/2003 | Danielli | B24B 5/42 33/555.1 |
| 2004/0055172 A1* | 3/2004 | Danielli | B24B 5/42 33/555.1 |
| 2010/0173565 A1* | 7/2010 | Junker | B24B 5/42 451/11 |
| 2012/0043961 A1* | 2/2012 | Volk | B24B 49/045 324/207.25 |
| 2014/0223750 A1* | 8/2014 | Diefenderfer | G01B 11/272 33/286 |
| 2015/0233693 A1* | 8/2015 | Senn | G01B 5/08 451/5 |

* cited by examiner

DEVICE FOR MEASURING THE FACES OF A CRANK BEARING

CROSS-REFERENCE TO RELATED APPLICATIONS

This application claims the priority of German Application No. DE 10 2014 113 553, filed 19, Sep. 2014, which is incorporated herein by reference.

FIELD OF THE INVENTION

The invention relates to a crank bearing face measuring device for measuring the faces of crank bearings of a crankshaft.

BACKGROUND OF THE INVENTION

In the manufacture of crankshafts it is necessary to measure main bearings of the crankshaft, which define a main axis of rotation of the crankshaft, as well as crank bearings on crank pins which are situated eccentrically with respect to the main axis of rotation. The measurement is used, for example and in particular, to check the axial runout properties of the faces of the main bearings and of the crank bearings.

For carrying out the necessary measurements, the crankshaft is initially clamped in such a way that it is rotated about its main axis of rotation, and during the rotation of the crankshaft the faces of the main bearings are contacted, using an appropriate measuring probe. The measuring data thus obtained may be used to check whether the faces of the main bearings have the required axial runout properties.

After the measurement of the faces of the main bearings is completed, the crankshaft is rechucked in such a way that the rotational axis about which the crankshaft is rotated during the subsequent measurement is defined by the rotational axis of symmetry of a crank bearing to be measured. After the rechucking, the crankshaft is rotated about this rotational axis, and the faces of the crank bearing are contacted using a probe. Since the crank pins are situated with differing eccentricities with respect to the main axis of rotation, this operation is repeated until all crank bearings have been measured.

In this regard, it is disadvantageous that the rechucking operation is time-consuming.

A manually operable surface line test apparatus is known from DE 30 46 708 C2 which is suited in particular for crankshaft pins. The surface line test apparatus known from the cited publication is mountable on a crank pin to be tested, and may be clamped onto same by means of a clamping device.

A manually operable face measuring apparatus is known from DE 16 24 105 U, by means of which the face spacing at bearing sites on crankshafts, for example, is measurable.

A grinding center for grinding crankshafts is known from DE 10 2007 026 562 B4, in which the main bearings are ground in a first station, and two lift bearings of the crankshaft are ground in pairs in each case in a second station.

A measuring device for in-process measurement of a test piece during a machining operation on a machining unit, in particular a grinding machine, is known from DE 10 2010 035 147 A1, having a measuring head which is movable, relative to a base body of the measuring device, between a neutral position and a measuring position in which the measuring head is in measuring contact with the test piece. The measuring head is connected to the base body via a rod assembly, and during the measurement of a crank pin of a crankshaft, follows the orbital rotations thereof about a main axis of rotation which is defined by the main axis of rotation of the crankshaft.

A similar measuring device is also known from US 2003/0056386 A1.

OBJECTS AND SUMMARY OF THE INVENTION

An object of the invention is to provide a crank bearing face measuring device for measuring the faces of crank bearings of a crankshaft, which reduces the required time expenditure during the measurement of crank bearings of a crankshaft.

The term face of a crank bearing is to be understood to include side or flank of a crank bearing, for example.

This object is achieved by the crank bearing face measuring device according to the invention for measuring faces of crank bearings of a crankshaft which includes a base body and a device for rotating the crankshaft about a main axis of rotation defined by main bearings of the crankshaft, as well as a measuring head having a probe prism for placing against a crank pin of the crank bearing, and at least one measuring probe for placing against a face of the faces of the crank bearing to be measured. Further, the measuring head is configured and connected to the base body in such a way that the measuring head follows orbital rotations of the crank pin during rotation of the crankshaft about the main axis of rotation.

A basic or fundamental concept of the invention lies in designing, namely configuring, the crank bearing measuring device, also referred to below as "measuring device" for short, in such a way that the measurement of the crank bearing faces takes place while the crankshaft is rotated about the main axis of rotation. In other words, the basic concept of the invention lies in designing the measuring device in such a way that rechucking of the crankshaft after measuring the main bearings and before measuring the crank bearings is not necessary.

To this end, the invention provides a measuring head which has a probe prism for placing against a crank pin of the crankshaft, and at least one measuring probe for placing against one of the faces of the crank bearing to be measured. According to the invention, the measuring head is also configured and connected to the base body in such a way that the measuring head follows orbital rotations of the crank pin during rotation of the crankshaft about the main axis of rotation.

Since according to the invention, the measuring head follows orbital rotations of the crank pin, the crank bearing faces may be measured while the crankshaft is rotated about the main axis of rotation defined by the main bearings of the crankshaft. A measurement of the main bearings and of the crank bearings may thus take place in the same chucking position of the crankshaft, so that rechucking is dispensed with. Measuring the faces of bearings of a crankshaft is thus particularly time-saving. This lowers costs, in particular for mass production.

When using the device according to the invention, when at least two measuring heads are used, it is also possible in particular to simultaneously measure at least one main bearing and at least one crank bearing of the crankshaft, which saves even more time in the measuring operation. In principle, it is also possible to measure all bearings of the crankshaft at the same time when the number of measuring heads provided corresponds to the number of bearings.

It is practical for the scanning direction of the measuring probe to run parallel or approximately parallel to the main axis of rotation. According to the invention, the scanning direction is understood to mean the direction in which the measuring probe contacts the face of the crank bearing to be measured. According to the invention, a contact which is approximately parallel to the main axis of rotation is understood to mean that within the scope of measuring accuracy, the contact is to be regarded as parallel to the main axis of rotation.

The measuring body may be connected to the base body in any desired way, as long as it is ensured that the measuring head is able to follow orbital rotations of the crank pin. In order to design the connection of the measuring head to the base body in a particularly simple and robust manner on this basis, one advantageous further embodiment of the invention provides that the measuring head is connected to the base body via a rod assembly.

In the above-mentioned embodiment, the rod assembly may be configured in any desired way that meets the particular requirements. In this regard, one advantageous further embodiment provides that the rod assembly has a first rod assembly element which on the one hand is connected to the base body about rotational axes that are parallel to the main axis of rotation, and on the other hand is connected to one end of a second rod assembly element, whose other end is connected to the measuring head, or to a component that is connected thereto, about a rotational axis that is parallel to the main axis of rotation. This embodiment provides a rod assembly which has a simple, and therefore economical and robust, configuration with a minimal number of components, and which achieves a connection of the measuring head to the base body in which the measuring head is able to follow orbital rotations of the crank pin during rotation of the crankshaft about the main axis of rotation. In this regard, a minimal number of rod assembly elements is also advantageous due to the fact that the number of articulated joints on the one hand between the rod assembly elements, and on the other hand among the rod assembly elements and between the measuring head and the base body, is minimized, so that effects on the measuring results due to play or manufacturing tolerances in or on the articulated joints are minimized.

One advantageous further embodiment of the above-mentioned embodiment provides that the probe prism is connected in a rotationally fixed manner to a holding arm which is connected to the second rod assembly element so as to be rotatable about a rotational axis that is parallel to the main axis of rotation.

According to the invention, it is sufficient in principle for the measuring head to have a single measuring probe. One extremely advantageous further embodiment of the invention provides that the measuring head has two measuring probes which scan in opposite scanning directions in order to simultaneously contact oppositely situated faces of a crank bearing. In this embodiment, the two oppositely situated faces of a crank bearing are simultaneously contacted and measured by means of the two measuring probes, thus further reducing the time expenditure for measuring the crank bearings of a crankshaft.

According to the invention, it is possible in principle to provide a pretensioning device for pretensioning the measuring head against the crank pin to be measured, wherein the pretensioning device may have a spring device, for example. To further reduce the number of components of the measuring device according to the invention, one advantageous further embodiment of the invention provides that the rod assembly and the measuring head are designed and configured in such a way that the probe prism is held in contact with the crank pin by gravitational force during orbital rotations of the measuring head. Separate pretensioning device are thus no longer necessary in principle.

According to the invention, it is possible in principle for an operator to manually bring the measuring head into contact with the crank bearing before starting a measurement by placing the probe prism on the crank pin. In this regard, one advantageous further embodiment provides a drive device for bringing the measuring head into contact with the crank pin. The drive device may, for example and in particular, have an electric motor drive, a hydraulic drive, or a pneumatic drive, and may be configured to meet the particular requirements. The drive device may be used not only for bringing the measuring head into contact with the crank pin before starting a measurement, but also for disengaging the measuring head from the crank pin after a measurement is completed.

One advantageous further embodiment of the above-mentioned embodiment provides a control apparatus for controlling the drive device in such a way that the drive device operates partially or fully automatically. In particular, in such an embodiment fully automatic operation is possible in which the drive device automatically brings the measuring probe into contact with the crank pin before starting a measurement, and automatically disengages it from the crank pin when a measurement is completed. Fully automatic operation may be achieved, for example, by a measurement control system transmitting a "start signal" to the control apparatus of the drive device, which actuates the drive device in such a way that the measuring head is brought into contact with the crank pin. After the measurement is carried out, the measurement control system may then transmit a "stop signal" to the control apparatus, which then actuates the drive device in such a way that the measuring head is disengaged from the crank pin.

In order to associate the measured values, recorded by the measuring probe during an orbital rotation of the crank pin, with the peripheral locations of the crank bearing face, a rotary transducer may be associated with the device for rotating the crankshaft about the main axis of rotation. Since a given rotational position of the measuring prism relative to the crank pin which corresponds to a rotational position of the crankshaft about the main axis of rotation is to be uniquely associated when the geometry of the crankshaft is known, it may be easily determined, using the output signals of the rotary transducer and the known geometry of the crankshaft, which recorded measured value corresponds to a given peripheral location of the crank bearing face.

The measured values determined by the measuring probe may be stored in a memory, and evaluated in an evaluation apparatus downstream from the memory. The design and function of such an evaluation apparatus, provided for cooperating with a measuring probe, are generally known to those skilled in the art and therefore are not explained in greater detail.

The invention is explained in greater detail below with reference to the appended drawings, which schematically illustrate one embodiment of a measuring device according to the invention.

Relative terms such as left, right, up, and down are for convenience only and are not intended to be limiting.

DETAILED DESCRIPTION OF THE INVENTION

Figure 1:
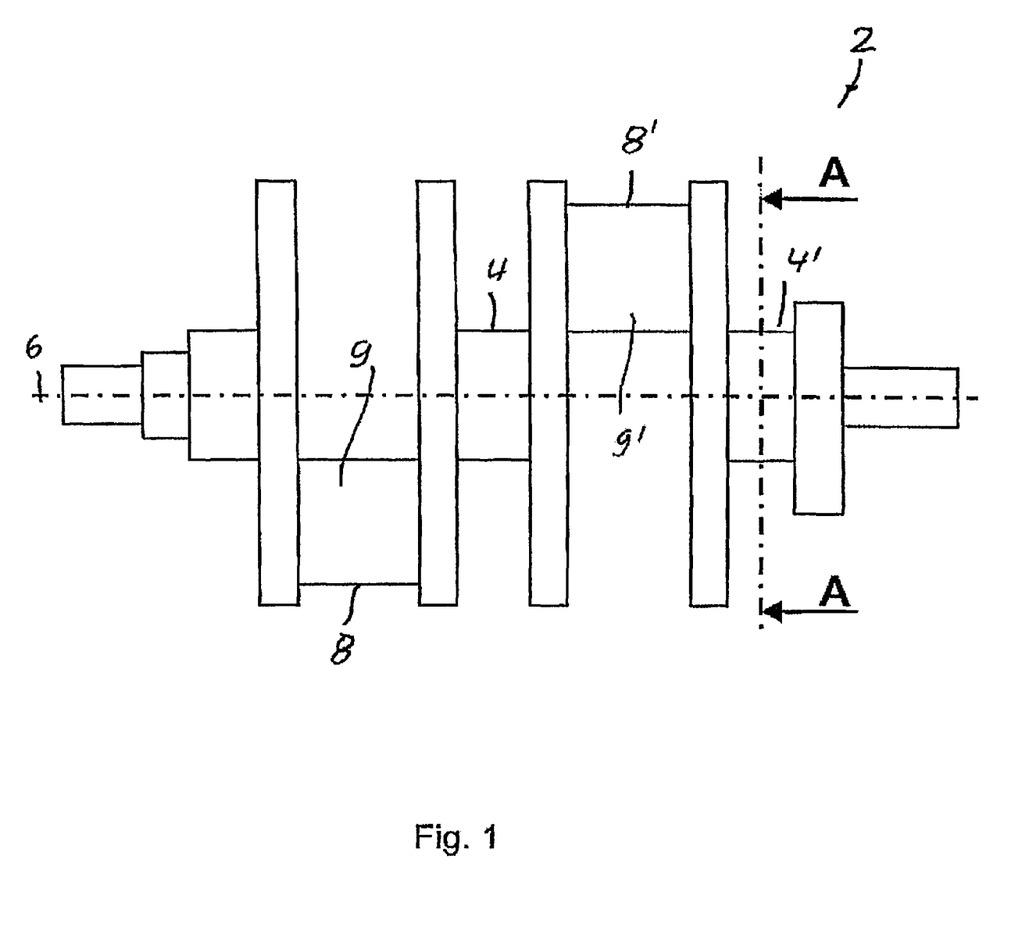
FIG. 1 is a radial view of a crankshaft.

FIG. 1 illustrates a crankshaft 2 having main bearings 4, 4' which define a main axis of rotation 6. The crankshaft 2 also has crank bearings 8, 8' which are situated eccentrically with respect to the main axis of rotation 6, and which thus undergo an orbital rotation when the crankshaft 2 rotates about the main axis of rotation 6. The crank bearings 8, 8' are formed on cylindrical crank pins 9, 9'. In other respects, the basic design of a crankshaft is generally known to those skilled in the art, and therefore is not explained here in greater detail.

Figure 2:
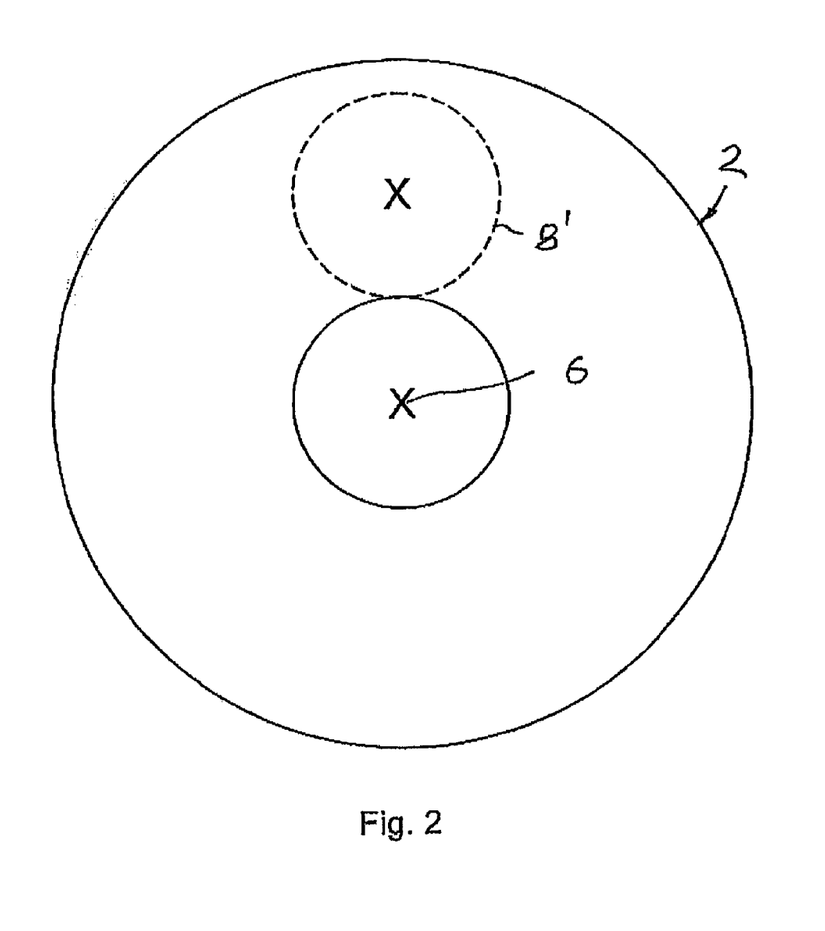
FIG. 2 is a section taken along a line A-A in FIG. 1 for illustrating the eccentric arrangement of the crank bearings relative to the main bearings of the crankshaft according to FIG. 1.

It is apparent from FIG. 2, which shows a section along a line A-A in FIG. 1, that the crank bearing 8' is situated eccentrically with respect to the main bearing 4 and the main axis of rotation 6. The same applies for the crank bearing 8.

Figure 3:
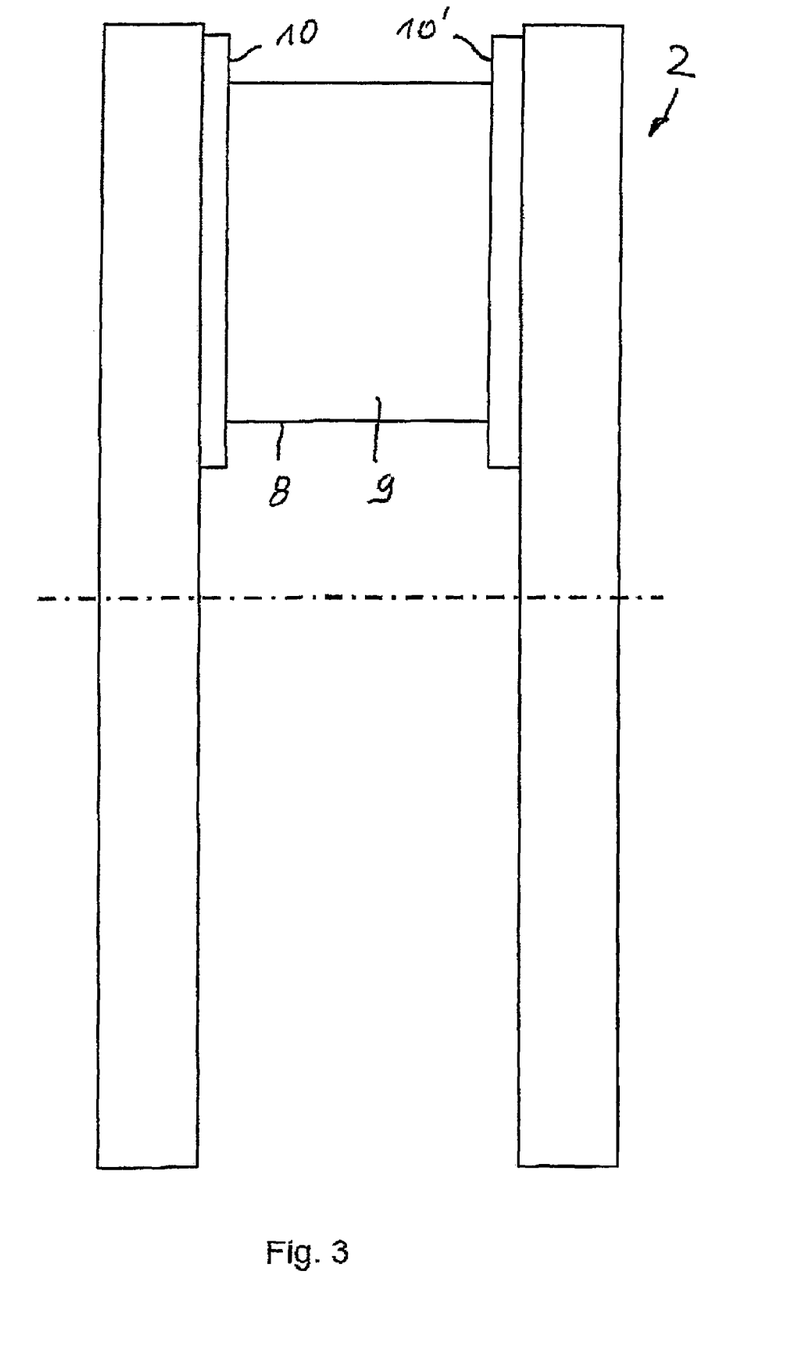
FIG. 3 is on an enlarged scale, a detail in the area of a crank bearing for illustrating the geometry of the crank bearing faces.

FIG. 3 shows, in enlarged scale, a detail from FIG. 1 in the area of the crank bearing 8, illustrating the geometry of the crank bearing 8 in greater detail. The crank bearing 8 has oppositely situated crank bearing faces 10, 10', extending in the peripheral direction of the crank bearing 8, which form friction bearing surfaces when the crankshaft 2 is used. Accordingly, during manufacture of the crankshaft 2 it is necessary to check the crank bearing faces 10, 10' in particular with regard to their axial runout properties. The corresponding axial runout measurement of crank bearing pins of a crankshaft is likewise generally known to those skilled in the art, and therefore is not explained here in greater detail.

Figure 4:
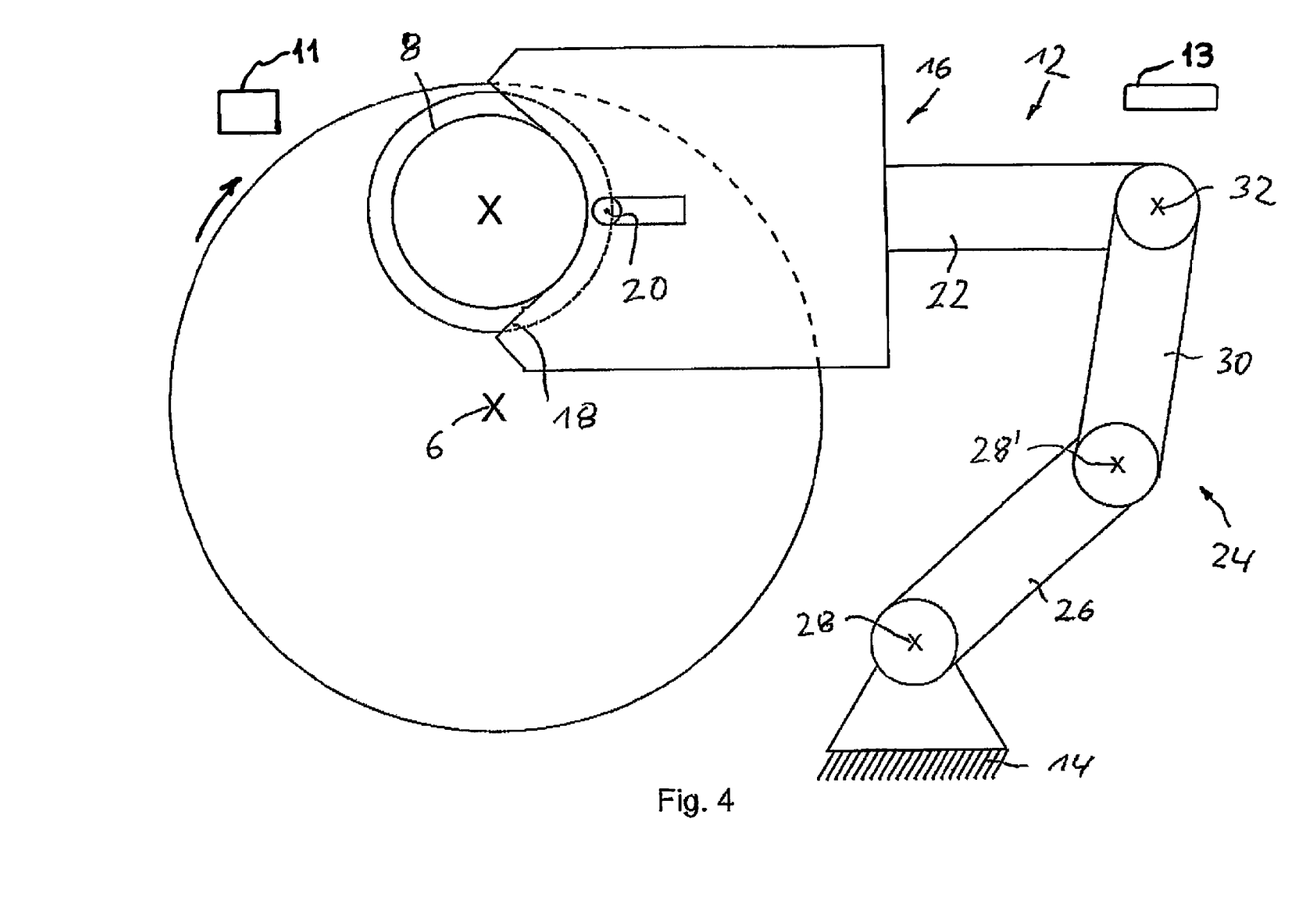
FIG. 4 shows in a highly schematic manner one embodiment of a device according to the invention during a measuring operation.

FIG. 4 illustrates in a highly schematic manner one embodiment of a crank bearing face measuring device 12 according to the invention, which is also referred to below as a measuring device 12 for short, and which has a base body 14. The measuring device 12 is used for measuring the faces 10, 10' of the crank bearings 8, 8', in particular with regard to their axial runout properties.

The measuring device 12 may include a device 11 for rotating the crankshaft 2 about the main axis of rotation 6 defined by the main bearings 4, 4' of the crankshaft, rotating device 11 having a rotary drive which is controllable by a control apparatus 13 of the measuring device 12, by means of which the crankshaft 2, which is clamped using a suitable clamping device (not illustrated), is rotated about the main axis of rotation 6. The design and function of such a rotary drive and of an associated control apparatus are generally known to those skilled in the art, so that these components are not illustrated or explained in detail.

The measuring device 12 according to the invention also has a measuring head 16 which has a probe prism 18 for placing against the crank bearing 8 to be measured.

The measuring head 16 also has a measuring probe 20 (see FIG. 5) which contacts the crank bearing face 10 in a scanning direction. As is apparent from a comparison of FIGS. 4 and 5, the measuring probe 20 contacts the crank bearing face 10, also referred to below as "face" for short, perpendicularly to its surface, so that the scanning direction of the measuring probe 20 extends essentially parallel to the main axis of rotation 6. As is apparent from FIG. 5, in the illustrated embodiment the measuring head 16 has an additional measuring probe 20' which is used for contacting the face 10' oppositely situated from the face 10. As a result of the measuring head 16 having two measuring probes 20, 20' which contact in opposite scanning directions, both faces 10, 10' may be simultaneously contacted and measured during a measuring operation.

According to the invention, the measuring head 16 is configured and connected to the base body 14 in such a way that the measuring head 16 follows orbital rotations of the crank pin 9, defined by the crank bearing 8, when the crankshaft 2 rotates about the main axis of rotation 6.

In the illustrated embodiment, the probe prism 18 is connected in a rotationally fixed manner to a holding arm 22, which is connected to the base body 14 of the measuring device 2 via a rod assembly 24. The rod assembly 24 has a first rod assembly element 26 which is connected on the one hand to the base body 14, about rotational axes 28, 28' parallel to the main axis of rotation 6, and on the other hand to one end of a second rod assembly element 30, whose other end is connected to the holding arm 22 about a rotational axis 32 parallel to the main axis of rotation 6. The rod assembly 24 forms, with a minimal number of components, an arrangement which allows the measuring head 16 to follow orbital rotations of the crank pin 8 when the crankshaft 2 rotates about the main axis of rotation 6. The probe prism 18 may be held in contact with the crank pin 8 by gravitational force, depending on the particular circumstances, while the crank pin undergoes orbital rotations. However, it is also possible according to the invention to hold the probe prism 18 in contact with the crank pin 8, optionally also by a pretensioning device.

Figure 5:
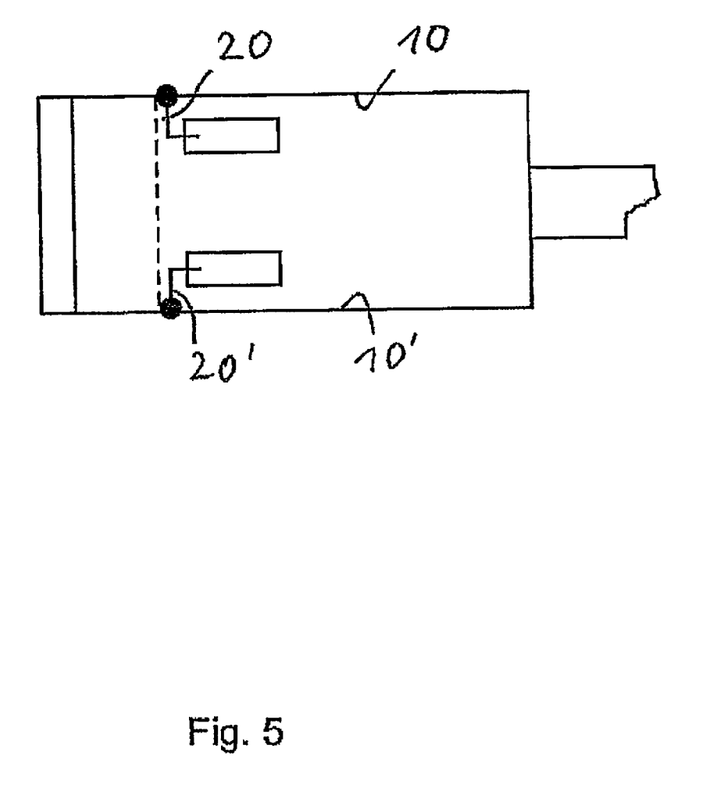
FIG. 5 shows a detail of the measuring device according to FIG. 4 in the area of the measuring probes.

The measuring device according to the invention 12 functions as follows:

Before beginning a measurement, the measuring head 16 is brought into contact with the crank pin 8 by a suitable drive (not illustrated) by placing the probe prism 18 on the outer peripheral surface of the crank pin 9. The measuring probes 20, 20' thus come into contact with the faces 10, 10' of the crank bearing 8. When the crankshaft 2 rotates about the main axis of rotation 6, the crank pin 9 undergoes an orbital rotation, whereby the faces 10, 10' rotate relative to the measuring probes 20, 20', and the measuring probes 20, 20' thus contact different peripheral locations of the faces 10, 10' in succession. The measured values recorded by the measuring probes 20, 20' are stored in a memory and transmitted to an evaluation apparatus.

To be able to associate the measured values thus determined with the respective peripheral locations of the faces 10, 10', a rotary transducer is associated with the rotary drive for rotating the crankshaft 2 about the main axis of rotation 6. Based on the output signals of the rotary transducer and the known geometry of the crankshaft 2 or the geometry of the rod assembly 24, the particular peripheral locations of the faces 10, 10' to which the recorded measured values belong may be determined in the evaluation apparatus. It may thus be determined in the evaluation apparatus whether the faces 10, 10' have the desired axial runout properties.

Since the faces 10, 10' can be measured by means of the measuring device 12 according to the invention while the crankshaft 2 is rotating about the main axis of rotation 6, the main bearings 4, 4' and the crank bearings 8, 8' of the crankshaft 2 may be measured in the same chucking position of the crankshaft 2, so that rechucking of the crankshaft 2 is dispensed with. The measurement of the main bearings 4, 4' and the crank bearings 8, 8' is therefore particularly time-saving and easy.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Crank bearing face measuring device for measuring faces of crank bearings of a crankshaft, the measuring device comprising:
   a) a base body;
   b) a device for rotating the crankshaft about a main axis of rotation defined by main bearings of the crankshaft;
   c) a measuring head having a probe prism for placing against a crank pin of the crank bearing, and having at least one measuring probe for placing against a face of the faces of the crank bearing to be measured; and,
   d) the measuring head being configured and connected to the base body in such a way that the measuring head follows orbital rotations of the crank pin during rotation of the crankshaft about the main axis of rotation.

2. Measuring device according to claim 1, wherein:
   a) the measuring probe has a scanning direction, and the scanning direction of the measuring probe is substantially parallel to the main axis of rotation.

3. Measuring device according to claim 1, wherein:
   a) the measuring head is connected to the base body via a rod assembly.

4. Measuring device according to claim 3, wherein:
   a) the rod assembly has a first rod assembly element which on the one had is connected to the base body about rotational axes that are parallel to the main axis of rotation, and on the other hand is connected to one end of a second rod assembly element, whose other end is connected to the measuring head, or to a component that is connected thereto, about a rotational axis that is parallel to the main axis of rotation.

5. Measuring device according to claim 4, wherein:
   a) the probe prism is connected in a rotationally fixed manner to a holding arm which is rotatably connected to the second rod assembly element.

6. Measuring device according to claim 1, wherein:
   a) the at least one measuring probe includes two measuring probes which scan in opposite scanning directions in order to simultaneously contact oppositely situated faces of a crank bearing.

7. Measuring device according to claim 3, wherein:
   a) the rod assembly and the measuring head are configured in such a way that the probe prism is held in contact with the crank pin by gravitational force during orbital rotations of the measuring head.

8. Measuring device according to claim 1, wherein:
   a) a drive device is provided for bringing the measuring head into contact with the crank pin.

9. Measuring device according to claim 8, wherein:
   a) a control apparatus is provided for controlling the drive for bringing the measuring head into contact with the crank pin in such a way that the drive operates at least partially automatically.

10. Measuring device according to claim 2, wherein:
    a) the measuring head is connected to the base body via a rod assembly.

11. Measuring device according to claim 10, wherein:
    a) the rod assembly has a first rod assembly element which on the one had is connected to the base body about rotational axes that are parallel to the main axis of rotation, and on the other hand is connected to one end of a second rod assembly element, whose other end is connected to the measuring head, or to a component that is connected thereto, about a rotational axis that is parallel to the main axis of rotation.

12. Measuring device according to claim 11, wherein:
    a) the probe prism is connected in a rotationally fixed manner to a holding arm which is rotatably connected to the second rod assembly element.

* * * * *